United States Patent [19]
Berson

[11] Patent Number: 5,288,994
[45] Date of Patent: Feb. 22, 1994

[54] IMAGE DETECTING APPARATUS AND METHOD FOR READING AND OR VERIFYING THE CONTENTS OF SEALED ENVELOPES

[75] Inventor: William Berson, Westport, Conn.
[73] Assignee: Pitney Bowes Inc., Stamford, Conn.
[21] Appl. No.: 971,657
[22] Filed: Nov. 5, 1992
[51] Int. Cl.⁵ .................. G01N 9/04; B07C 5/00
[52] U.S. Cl. .................. 250/223 R; 250/557; 209/584; 209/900
[58] Field of Search .................. 250/223 R, 568, 569, 250/566, 271, 555–557, 559, 561; 356/71; 209/584, 583, 900

[56] References Cited

U.S. PATENT DOCUMENTS

| | | | |
|---|---|---|---|
| 3,933,094 | 1/1976 | Murphy et al. | 209/584 |
| 4,317,030 | 2/1982 | Berghell | 250/569 |
| 4,446,204 | 5/1984 | Kaule et al. | 356/71 |
| 4,540,887 | 9/1985 | Minerd et al. | 250/223 r |
| 4,723,072 | 2/1988 | Naruse | 356/71 |
| 4,828,104 | 5/1989 | Ribellino, Jr. | 209/584 |
| 4,838,435 | 6/1989 | Alexandre et al. | 209/584 |
| 4,908,768 | 3/1990 | Gelfer et al. | 229/584 |
| 5,031,223 | 7/1991 | Rosenbaum et al. | 209/584 |
| 5,036,190 | 7/1991 | Lile et al. | 250/223 R |
| 5,036,984 | 8/1991 | Labarthe | 209/584 |

FOREIGN PATENT DOCUMENTS 9012660  11/1990  World Int. Prop. O. .......... 209/584

*Primary Examiner*—Michael Messinger
*Attorney, Agent, or Firm*—Peter Vrahotes; Melvin J. Scolnick

[57] ABSTRACT

This invention relates to reading and analyzing the contents of sealed mail. The invention has utility in the sorting of sealed mail and in the matching of mail envelopes and its contents. The contents of sealed mail are read by having a light in the near infrared directed to the sealed envelope and creating an image of the printed matter on the contents by directing the light to an optical detector. The image thus received is analyzed and a determination can be made whether contents are of high value or whether the addresses on the envelope match the addresses of the contents. If the envelopes are not addressed, the address can be printed on the envelope after analysis of the address block of the contents.

17 Claims, 2 Drawing Sheets

IMAGE DETECTING APPARATUS AND METHOD FOR READING AND OR VERIFYING THE CONTENTS OF SEALED ENVELOPES

BACKGROUND OF THE INVENTION

Field of the Invention

In the processing of mail, there are two wide spread activities, sorting of mail and match mailing. There are various forms of sorting mail that rely on the address, or a code, printed on the face of a mail piece. By reading such address or code, the mail can be sorted with regard of destination. One feature that is lacking in the field of sorting is being able to sort mail in accordance with its contents. Frequently, mail arrives in random order at a place of business. In some cases, business reply envelopes are used to identify high value mail, such as payments, policy changes and other high value items. Such high value mail enters the incoming mail stream along with ordinary business communications and needs to be hand sorted. Remittances must thus be delayed until the envelopes are opened and the contents thereof sorted by hand. This invention allows high value incoming mail to be outsorted prior to being opened so that its processing can be carried out without the need of manual activities.

In the case of match mailing, it is often the case that an insert is created which is unique to the recipient, such as telephone bills, insurance statements, receipts and the like. The mail piece must be addressed for the correct recipient. In one present practice, windowed envelopes are used to avoid the need for verification of an address because the address which is printed on the insert shows through the envelope. Windowed envelopes are costly, especially those windowed envelopes that use glassine windows which are quite expensive. It also results in mail which is much less machinable and less processable by the post office, because windows tend to cause jams in automatic mail processing equipment.

When regular (non window) envelopes are used, it is common practice for mailers to manually open and check pieces in a mail run randomly. This is not only expensive, but discovery of an error means that all mail pieces produced since the last check must be discarded. To avoid such activities with regular envelopes, match mailing is practiced. Matched mailing involves various schemes to assure that the contents of the envelope match the address printed thereon.

Description of Related Art

In the field to which the invention applies, the content of mail pieces are normally determined before being placed into an envelope. For example, in U.S. Pat. No. 5,067,088 entitled APPARATUS AND METHOD FOR ASSEMBLING MASS MAIL ITEMS, a mail matching system includes a number of video cameras each of which is positioned to sense an alphanumeric sequence indicator on a different component of a mail item being assembled. After the data on the mail contents are read, the contents are stuffed into an envelope. U.S. Pat. No. 4,733,856 entitled MECHANISM FOR FORMING PERSONALIZED ENVELOPS AND INSERTS relies upon a computer for controlling two printers, one of which prints data on the inserts and the other of which prints data on an envelope, which data should correspond to one another. The inserts and envelopes are synchronized so that the appropriate inserts are placed into an envelope. U.S. Pat. No. 4,429,217 entitled VERIFYING INSERTION SYSTEM AND APPARATUS discloses sensing information on credit cards and comparing the information with a preprinted carrier. After comparison, the credit card is secured onto a matching carrier, the carrier is folded and inserted into mail envelopes. The system includes sensing, comparison logic and timed command circuitry for coordination of operation. In short, the prevailing systems perform activities for matching the inserts to the envelope before insertion thereof.

SUMMARY OF THE INVENTION

This invention allows high value incoming mail to be outsorted from other incoming mail, prior to being opened so that its processing can be expedited. This sortation is achieved by optically reading encoded marks on the contents, i.e. inserts, of the envelope, such as a payment stub or check or by reading text on the document itself through the sealed envelope. An image analysis system is used to reconstruct the image of the identifying marks or to identify the pattern of the contents such as checks, business forms, payment stubs and the like. Complete readability of the image is not required where the document is to be identified only as being value mail. In an alternative embodiment, matched mail is produced with verification of the correct address after insertion and sealing. This may be done by reading the address block of an insert just prior to the address being printed on the envelope. This is achieved by optically reading a preprinted code or address of the insert through the sealed envelope and analyzing the same through an image analysis system. The printer is controlled by the image analyzer to print the correct addresses on the envelope.

The invention is based on the principal that paper may be opaque to the eye, but most paper used for making an envelope and insert stock is transparent to various frequencies of light, especially in the near infrared (IR) region. In the same region, inks commonly used for the printing of mail pieces, as for example, both ink jet printing ink and laser printing ink, are particularly absorbent in this spectral region. The net result is that when exposed to an intense light source of the appropriate frequency, a signal can be generated and detected which is sufficient for decoding so as to identify the contents, address or identifying code for achieving identification or verification of the contents of an envelope.

DETAILED DESCRIPTION OF THE PREFERRED EMBODIMENTS

Figure 1:
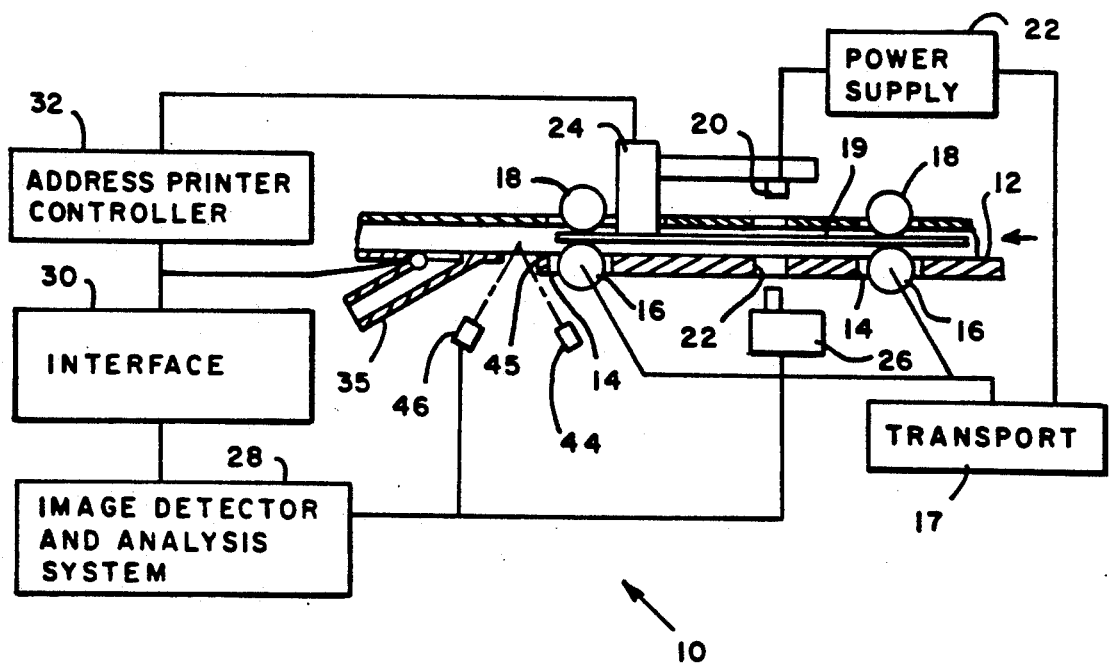
FIG. 1 in a view, partially cross sectional and partially in functional block diagram form, of an apparatus in which the instant invention can be practiced.

With reference to FIG. 1, an apparatus for reading and or verifying the contents of sealed mail is shown generally at 10. In FIG. 1 the apparatus for conveying and reading the contents of the mail piece are shown in cross-section; whereas, the components for processing the detected image are shown in functional block diagram form. The system 10 includes a transportation deck 12 that has a plurality of openings 14 for receiving drive rollers 16 therein. The drive rollers 16 are connected to a transportation control system 17 that includes a drive train and motor (not shown) for driving the rollers 16. Located above the drive rollers 16 in a parallel and contacting fashion are a pair of idler rollers 18. The rollers 16 and 18 are adapted to receive sealed envelopes, in the form of a mail piece 19, in the nips thereof and drive mail pieces 19 in a stream from right to left as indicated by the arrow. Located intermediate the idler rollers 18 is a light source 20 that is connected to a power supply 22, the latter also supplying power to the transportation control system 17. The light source 20 directs a beam of light through an opening 22 in the transportation deck 12 to be received by an optical detector 26. An optional printer 24 is located above the transportation deck 12 for printing the address and other information on a mail piece. The printer 24 can be an ink jet printer, thermal printer or any convenient type of printer. It will be appreciated where only mail is to be sorted, the printer 24 is not required.

The optical detector 26 is in communication with an image detector and analysis system 28, which is in turn in communication with an interface 30. The image detector and analysis system 28 can be one of a number of commercially available unit such as a model C-2 Image Analyzer available from Olympus Corp. The interface 30 is in communication with a diverter 31 located on the conveying path and a print head controller 32 which is in communication with the print head 24. The diverter 31 includes a finger 33, or van, that can divert envelopes to an outsorting path 35. Optionally, downstream from the rollers 16, 18 is another opening 45 and light source 44 and optical detector 46 combination. This combination is used only when the address of the contents is to be read and checked with the address printed on the envelope 19.

Figure 2:
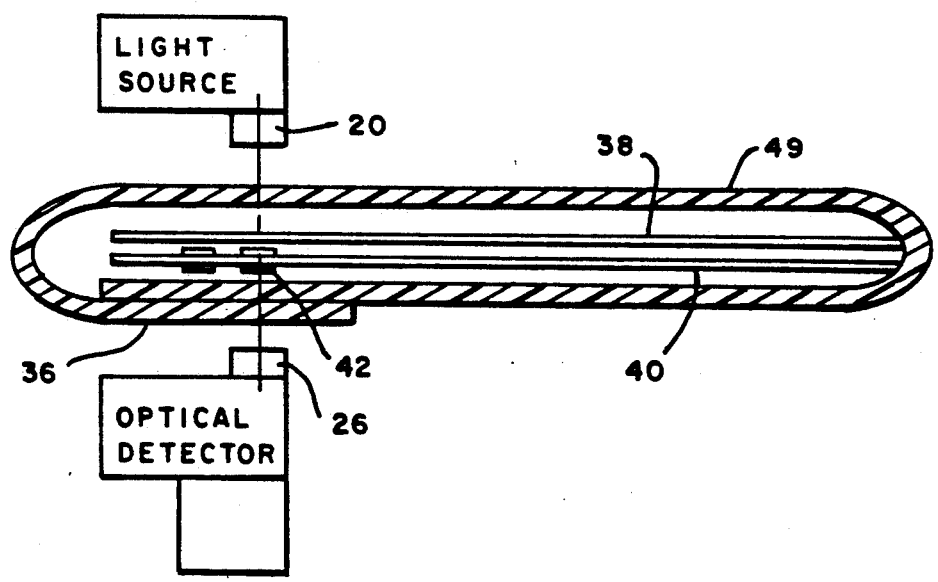
FIG. 2 shows a cross sectional view in greater detail of a portion of the apparatus shown in FIG. 1.

Referring now to FIG. 2, in envelope 19 is shown having a flap 36 that is sealed, a first insert 38 and a second insert 40. The second insert 40 has printing 42 thereon that may be either in the form of a shape, code or an address block. The light source 20 emits light in the IR range, preferably 650 nm to 800 nm, and the light travels through the envelope 19. As the light is directed through the sealed envelope 19, the printed matter 42 is detected by the optical detector 26. One of the shapes that could be detected and identified by the image detector and analysis system 28 is cash.

The rollers 16, 18 not only serve the function of driving the sealed envelope 19 across the transportation deck 12, but also serve the function of pressing the sides of the envelope and its contents against one another to reduce air gaps. Having the envelope 19 portions and contents pressed against one another aids in the detection of the printed matter 42 by the optical detector 26. It will be appreciated that more than one sheet 38 in the envelope can be read and analyzed.

Upon the optical detector 26 detecting light, signals will be transmitted in response thereto to the image detector and analysis system 28 which will then determine if what is being transmitted represents either a predetermined form, a code or an address block. The image detector and analysis unit 28 will have a processor that is programmed for this purpose. Once a determination is made that a predetermined form, a code or address block has been detected, signals will be sent either to the printer 24 or to the diverter 33 through an interface 30. In the embodiment where addresses are printed on a mail piece, the address printer controller 32, under the control of the image detector analysis processor 28, can control the printer 24 to print the address on the sealed envelope that matches the address on the contents. In this manner one achieves match mailing.

In another embodiment, the apparatus 10 is used for detection of the contents of an envelope 19 for determining whether the contents of the envelope contain priority mail that should be outsorted so as to be handled more rapidly. The image detector and analysis system 28 is able to determine if the contents represent a check, a reply, an urgent message and the like based upon the code or form printed thereon. If such high value mail is determined, the mail piece 19 is outsorted by enabling the diverter finger 33 to direct the mail piece 19 to the outsort path 35.

Figure 3:
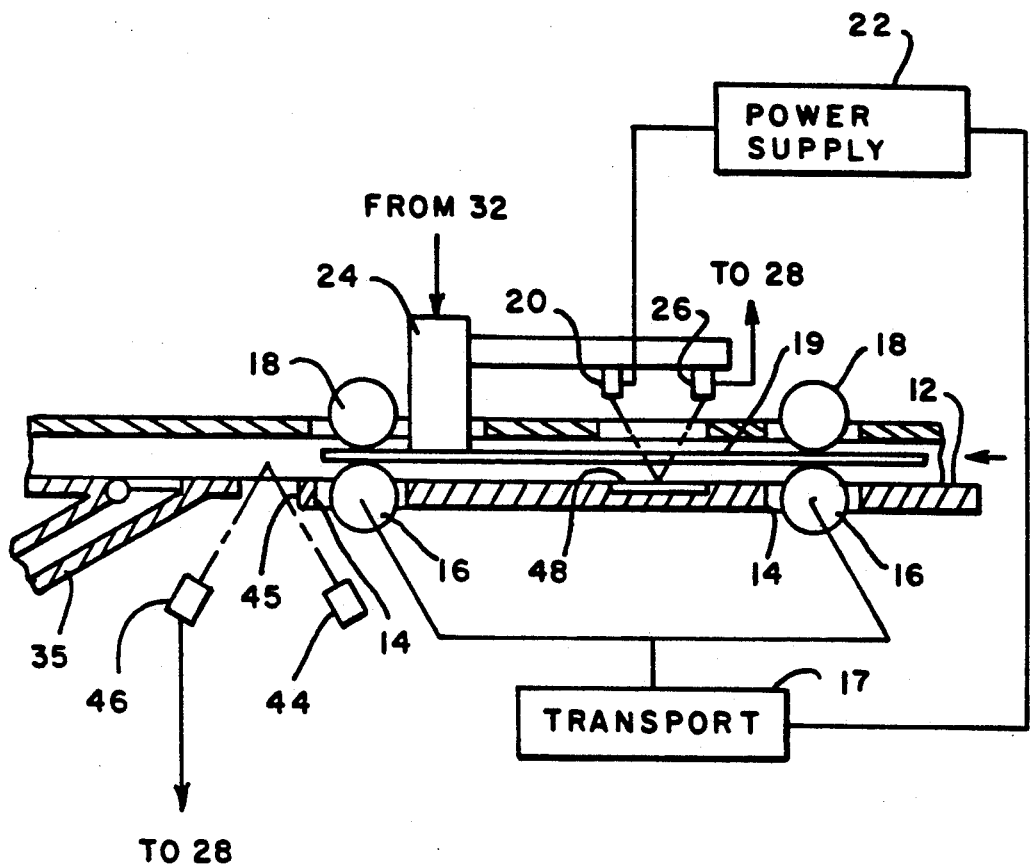
FIG. 3 is an alternative embodiment of the apparatus shown in FIG. 1, like reference numbers being used to designate like parts.

With reference to FIG. 3, where like reference numbers are used to designate like parts as in FIG. 1, another embodiment is shown. The transportation deck 12 has a reflective surface 48 on at least a portion of the conveying path. The optical detector 26 is located adjacent the light source 20 above the transportation deck 12 as seen in FIG. 3. Light is directed from the light source 20 toward the reflective surface 48 and reflected to the optical detector 26. Thus, the optical detector 26 receives images of code or addresses printed on the contents of an envelope being conveyed across the reflective surface 44.

Thus, what has been shown and described is an apparatus and method for reading the contents of a sealed envelope and processing as required after such reading of the envelope contents.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. Apparatus for distinguishing high value content in sealed envelopes from other envelopes in a stream of envelopes, comprising: envelope conveying means defining a conveying path, a source of light spaced from said conveying means for emitting light upon said conveying path, an optical detector positioned relative to said light source to receive light directed to said conveying path, and an image detector and analysis system in communication with said optical detector for reading the contents of a sealed envelope on said conveying path and analyzing the contents to determine if the same are high value contents.

2. The apparatus of claim 1 further including a diverter located on said conveying path downstream from said source of light, said diverter being in communication with said image detector and analysis system for separating envelopes containing high value contents identified by said image detector and analysis system from other envelopes.

3. The apparatus of claim 2 wherein light emitted by said light source has a wavelength between 650 nm to 800 nm.

4. The apparatus of claim 3 wherein said optical detector is spaced relative to said light source and said conveying path intermediate said light source and said optical detector whereby said optical detector receives light that passes through an envelope located between said light source and said optical detector.

5. The apparatus of claim 3 wherein said light source and said optical detector are located on the same side of said conveying path and further including the conveying path having a reflective surface spaced from said light source so as to reflect light received from said light source to said optical detector.

6. The apparatus of claim 3 wherein said image detector and analysis system includes means for detecting multiple image inserts in an envelope, and said diverter includes means for diverting envelopes with detected multiple image inserts.

7. The apparatus of claim 3 wherein said image detector and analysis system includes means for detecting cash in an envelope conveyed along said conveying path and said diverter includes means for diverting envelopes with cash detected therein.

8. Apparatus for match mailing of an address on an envelope with the address on the contents of the envelope, comprising: envelope conveying means defining a conveying path, a source of light spaced from said conveying means for emitting light upon said conveying path, an optical detector positioned relative to said light source to receive light directed to said conveying path, and an image detector and analysis system in communication with said optical detector for reading the contents of a sealed envelope on said conveying path and analyzing the contents thereof and a printer in communication with said image detector and analysis system for printing an address on an envelope that matches the contents thereof.

9. The apparatus of claim 8 wherein light emitted by said light source has a wavelength between 650 nm to 800 nm.

10. The apparatus of claim 8 wherein said optical detector is spaced relative to said light optical source and said conveying path is intermediate said light source and said optical detector whereby said optical detector receives light that passes through an envelope located between said light source and said optical detector.

11. The apparatus of claim 8 wherein said light source and said optical detector are located on the same side of said conveying path and further including the conveying path having a reflective surface spaced from said light source so as to reflect light received from said light source to said optical detector.

12. Apparatus for reading printed matter on the contents of sealed envelopes, comprising: envelope conveying means defining a conveying path, a source of light spaced from said conveying means for emitting light upon said conveying path, an optical detector positioned relative to said light source to receive light directed by said light source to said conveying path, and an image detector and analysis system in communication with said optical detector for reading the contents of a sealed envelope on said conveying path.

13. The apparatus of claim 12 wherein light emitted by said light source has a wavelength between 650 nm to 800 nm.

14. The apparatus of claim 12 wherein said optical detector is spaced relative to said light source and said conveying path is intermediate said light source and said optical detector whereby said optical detector receives light that passes through an envelope located between said light source and said optical detector.

15. The apparatus of claim 12 wherein said light source and said optical detector are located on the same side of said conveying path and further including the conveying path having a reflective surface spaced from said light source as to reflect light received from said light source to said optical detector.

16. Method of distinguishing high value content in sealed envelopes from other envelopes, the steps comprising:

conveying envelopes along a path serially, emitting light having a wave length between 650 nm to 900 nm upon said envelopes, receiving light directed to said conveying path and through an envelope reading contents of a sealed envelope on said conveying path, and analyzing the contents to determine if the same are high value contents.

17. The method of claim 16 further including the step of separating high value envelopes from other envelopes.

* * * * *